US011900856B2

(12) United States Patent
Tang et al.

(10) Patent No.: US 11,900,856 B2
(45) Date of Patent: Feb. 13, 2024

(54) PROTECTION CIRCUIT FOR DISPLAY DEVICE AND DISPLAY DEVICE COMPRISING SAME, AND METHOD FOR PROTECTING DISPLAY DEVICE USING PROTECTION CIRCUIT

(71) Applicants: HEFEI BOE DISPLAY TECHNOLOGY CO., LTD., Anhui (CN); BOE TECHNOLOGY GROUP CO., LTD., Beijing (CN)

(72) Inventors: Jituo Tang, Beijing (CN); Kun Yang, Beijing (CN); Zhihua Sun, Beijing (CN); Feng Qu, Beijing (CN); Ming Deng, Beijing (CN); Ruilian Li, Beijing (CN); Tianxun Xiu, Beijing (CN); Zhun Lin, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,540

(22) PCT Filed: Aug. 5, 2021

(86) PCT No.: PCT/CN2021/110791

§ 371 (c)(1),
(2) Date: Jun. 23, 2022

(87) PCT Pub. No.: WO2022/052688

PCT Pub. Date: Mar. 17, 2022

(65) Prior Publication Data

US 2023/0034489 A1 Feb. 2, 2023

(30) Foreign Application Priority Data

Sep. 14, 2020 (CN) ......................... 202010961074.7

(51) Int. Cl.
*G09G 3/20* (2006.01)

(52) U.S. Cl.
CPC ... *G09G 3/2092* (2013.01); *G09G 2310/0267* (2013.01); *G09G 2310/0289* (2013.01); *G09G 2330/021* (2013.01); *G09G 2330/04* (2013.01)

(58) Field of Classification Search
CPC ......... G09G 3/2092; G09G 2310/0267; G09G 2310/0289; G09G 2330/021; G09G 2330/04; G09G 3/20; G09G 2300/0408
See application file for complete search history.

(56) References Cited

U.S. PATENT DOCUMENTS

2014/0191935 A1* 7/2014 Morii ................... G09G 3/3677 345/92
2017/0263166 A1* 9/2017 Chen ..................... G02F 1/1309
(Continued)

FOREIGN PATENT DOCUMENTS

CN 105162077 A 12/2015
CN 105304050 A 2/2016
(Continued)

OTHER PUBLICATIONS

Office action issued for Chinese Application No. 202010961074.7, dated Jan. 5, 2022, 18 pages.
(Continued)

*Primary Examiner* — Jose R Soto Lopez
(74) *Attorney, Agent, or Firm* — Dave Law Group LLC; Raj S. Dave

(57) ABSTRACT

The present disclosure relates to a protection circuit for a display device, a display device thereof, and a method for protecting a display device using a protection circuit. The display device includes a gate driving circuit, a level shift circuit, and a power management circuit. The level shift circuit is configured to provide an input signal to a signal
(Continued)

input terminal of the gate driving circuit. The power management circuit is configured to provide power to the gate driving circuit. The protection circuit is configured to provide a power control signal to the power management circuit based on a current at the signal input terminal of the gate driving circuit, so that the power management circuit stops providing the power to the gate driving circuit.

11 Claims, 6 Drawing Sheets

(56) References Cited

U.S. PATENT DOCUMENTS

| | | | | |
|---|---|---|---|---|
| 2017/0316728 | A1 | 11/2017 | Lee et al. | |
| 2019/0204694 | A1* | 7/2019 | Wang | G02F 1/136204 |
| 2020/0020265 | A1 | 1/2020 | Lee | |
| 2020/0024265 | A1* | 1/2020 | Braunschweig | C07C 211/27 |
| 2021/0021120 | A1* | 1/2021 | Qiu | G09G 3/2092 |
| 2021/0272530 | A1* | 9/2021 | Hosoya | G09G 3/3677 |
| 2021/0304694 | A1 | 9/2021 | Qiu | |
| 2022/0005432 | A1* | 1/2022 | Katsuta | G06F 3/04184 |
| 2022/0068179 | A1* | 3/2022 | Jang | G09G 3/2096 |

FOREIGN PATENT DOCUMENTS

| | | | |
|---|---|---|---|
| CN | 105448260 | A | 3/2016 |
| CN | 107068092 | A | 8/2017 |
| CN | 107395006 | A | 11/2017 |
| CN | 107508252 | A | 12/2017 |
| CN | 107742493 | A | 2/2018 |
| CN | 109448658 | A | 3/2019 |
| CN | 109637412 | A | 4/2019 |
| CN | 110060644 | A | 7/2019 |
| CN | 110718197 | A | 1/2020 |
| CN | 11986611 | A | 11/2020 |
| CN | 109617008 | A | 1/2021 |

OTHER PUBLICATIONS

Office action issued for Chinese Application No. 202010961074.7, dated Jun. 14, 2022, 13 pages.

* cited by examiner (a) (b)

(a) (b)

PROTECTION CIRCUIT FOR DISPLAY DEVICE AND DISPLAY DEVICE COMPRISING SAME, AND METHOD FOR PROTECTING DISPLAY DEVICE USING PROTECTION CIRCUIT

CROSS REFERENCE TO RELATED APPLICATIONS

This patent application is a National Stage Entry of PCT/CN2021/110791 filed on Aug. 5, 2021, which claims the benefit and priority of Chinese Patent Application No. 202010961074.7 filed on Sep. 14, 2020, the disclosures of which are incorporated by reference herein in their entirety as part of the present application.

TECHNICAL FIELD

Embodiments of the present disclosure relate to a field of displaying technology, and particularly, relate to a protection circuit for a display device, a display device thereof, and a method for protecting a display device using a protection circuit.

BACKGROUND

With development of displaying technology, a display panel is developed towards a direction of high integration and low cost. At present, medium and large-sized display panels basically adopt a Gate Driver on Array (GOA) architecture. That is, a row scan driving circuit is integrated inside the display panel using the same manufacturing process as that of TFT.

SUMMARY

Embodiments of the present disclosure provide a protection circuit for a display device, a display device thereof, and a method for protecting a display device using a protection circuit.

In an aspect of the present disclosure, a protection circuit for a display device is provided. The display device includes a gate driving circuit, a level shift circuit, and a power management circuit. The level shift circuit is configured to provide an input signal to a signal input terminal of the gate driving circuit. The power management circuit is configured to provide power to the gate driving circuit. The protection circuit is configured to provide a power control signal to the power management circuit based on a current at the signal input terminal of the gate driving circuit, so that the power management circuit stops providing the power to the gate driving circuit.

In an embodiment of the present disclosure, the protection circuit includes a control circuit, a current detection circuit, a comparison circuit, a current detection terminal and a control signal output terminal. The current detection terminal is configured to receive the current at the signal input terminal of the gate driving circuit. The control signal output terminal is configured to provide the power control signal to the power management circuit. The control circuit is coupled to the current detection circuit and the comparison circuit, and configured to send a first control signal to the current detection circuit to control an operation of the current detection circuit and send a second control signal to the comparison circuit to control an operation of the comparison circuit. The current detection circuit is coupled to the current detection terminal and the comparison circuit, and configured to detect the current at the signal input terminal of the gate driving circuit under a control of the control circuit, and send the detected current to the comparison circuit. The comparison circuit is coupled to the control signal output terminal, and configured to compare the current to a first threshold under a control of the control circuit, and to generate the power control signal at the control signal output terminal based on a comparison result.

In an embodiment of the present disclosure, generating the power control signal based on the comparison result includes: generating the power control signal at the control signal output terminal when the current is greater than the first threshold.

In an embodiment of the present disclosure, the control circuit is further configured to receive and store control parameters.

In an embodiment of the present disclosure, the control parameters include the first threshold and a detection time. The detection time is a time interval between a transition edge of a voltage signal at the signal input terminal to be detected from the gate driving circuit and a timing when the current is detected.

In an embodiment of the present disclosure, the control parameters further include a second threshold. The second threshold is a number of times N of continuous detections of the current based on the detection time, where N is an integer greater than 1, and the current detected each time is greater than the first threshold.

In an embodiment of the present disclosure, generating the power control signal based on the comparison result includes: generating the power control signal at the control signal output terminal when a plurality of detections are continuously performed and the number of detections is equal to the second threshold.

In an embodiment of the present disclosure, the signal input terminal of the gate driving circuit includes a clock signal input terminal for receiving clock signals from the level shift circuit.

In an embodiment of the present disclosure, the detection time is in a range of 2-16 μs. The first threshold is in a range of 30-200 mA. The second threshold is 4, 8, 16 or 32.

In an embodiment of the present disclosure, the detection time is 6 μs. The first threshold is 50 mA. The second threshold is 8.

In an embodiment of the present disclosure, the protection circuit and the level shift circuit or the power management circuit are integrated into a same integrated circuit.

In an embodiment of the present disclosure, the power management circuit is further configured to provide power to the level shift circuit.

In another aspect of the present disclosure, a display device including the protection circuit as described above is provided. The display device further includes a display substrate. The display substrate includes a display region for displaying and a peripheral region surrounding the display region. The gate driving circuit is located in the peripheral region.

In an embodiment of the present disclosure, the gate driving circuit includes clock signal lines in the peripheral region. The level shift circuit provides clock signals to the gate driving circuit through the clock signal lines. The current detection terminal of the protection circuit is coupled to the clock signal lines.

In yet another aspect of the present disclosure, a method for protecting a display device using the protection circuit as described above is provided. The method includes: in response to the detected current at the signal input terminal of the gate driving circuit, the protection circuit generates the power control signal; and in response to the power control signal, the power management circuit stops providing power to the gate driving circuit.

Further aspects and areas of applicability will become apparent from the description provided herein. It should be understood that various aspects of the present application may be implemented individually or in combination with one or more other aspects. It should further be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several diagrams of the drawings.

DETAILED DESCRIPTION

Figure 1:
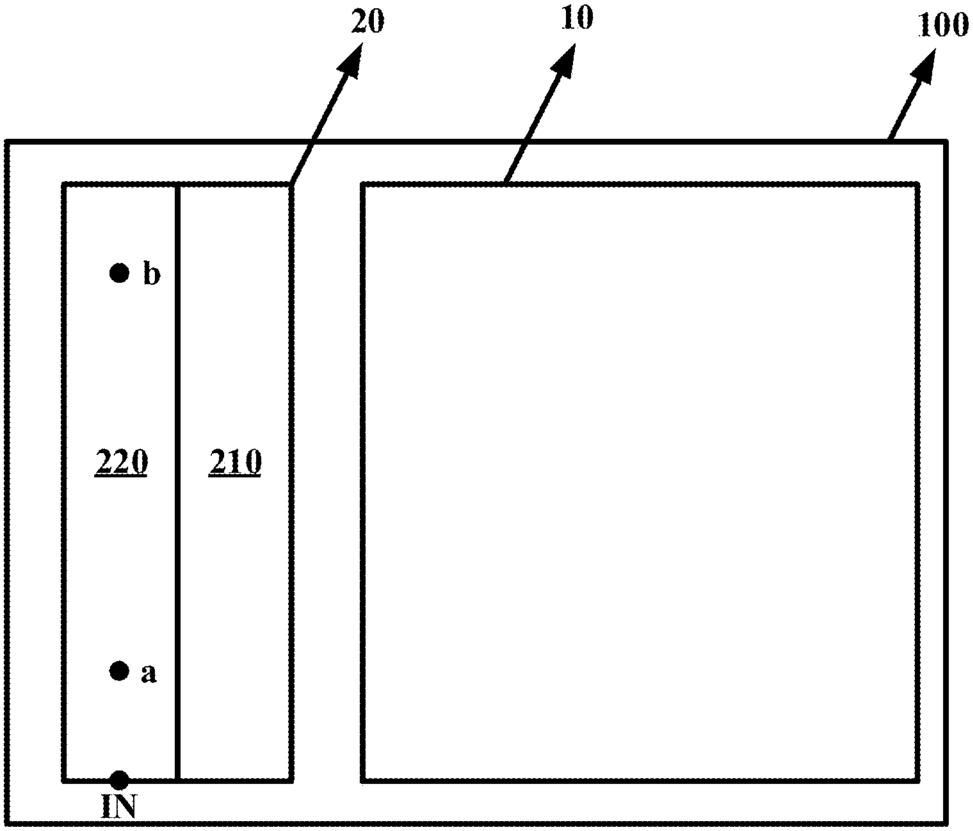
FIG. 1 shows a planar structure of a display panel.

Firstly, it should be noted that, as used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. The term "example" used herein, particularly when followed by a listing of terms, is merely exemplary and illustrative and should not be deemed to be exclusive or comprehensive.

Additionally, further to be noted, when the elements and the embodiments thereof of the present application are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation.

Next, in the drawings, the thickness and area of each layer are exaggerated for clarity. It should be understood that when a layer, a region, or a component is referred to as being "on" another part, it is meant that it is directly on the another part, or there may be other components in between. In contrast, when a certain component is referred to as being "directly" on another component, it is meant that no other component lies in between.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

Exemplary embodiments will now be described more fully with reference to the accompanying drawings.

During a process for manufacturing a display device, there are certain fluctuations for factors such as equipments, process environment, and raw materials. When such fluctuations exceed process specifications, process defects will occur. Specifically, when manufacturing devices, process defects may cause wirings to be short-circuited, resulting in a short circuit; or there are more dust particles between wirings, thereby causing overlap between adjacent wirings and thus resulting in a short-circuit.

FIG. 1 shows a planar structure of a display panel. The display panel 100 includes the gate driving circuit 20 located in a peripheral region of the display panel 100. The gate driving circuit 20 includes a GOA unit 210 for providing gate driving signals to a pixel array and signal lines 220 for providing various input signals to the GOA unit 210. When a specific signal line (e.g., a clock signal line) of the signal lines 220 is short-circuited, an instantaneous large current and a local temperature rise will be generated at the short-circuited location, thereby possibly causing a damage to a device. In addition, some extreme operation conditions in an external environment (e.g., high temperature, high humidity, Electro-Static Discharge (ESD), etc.) potentially increase the possibility of the damage to the device. Additionally, when two short circuits occur at locations a and b in the signal line 220, since the location a is closer to a signal input terminal IN than the location b and has a smaller IR-drop than that of the location b, a short-circuit current at the location a is greater than a short-circuit current at the location b.

Figure 2:
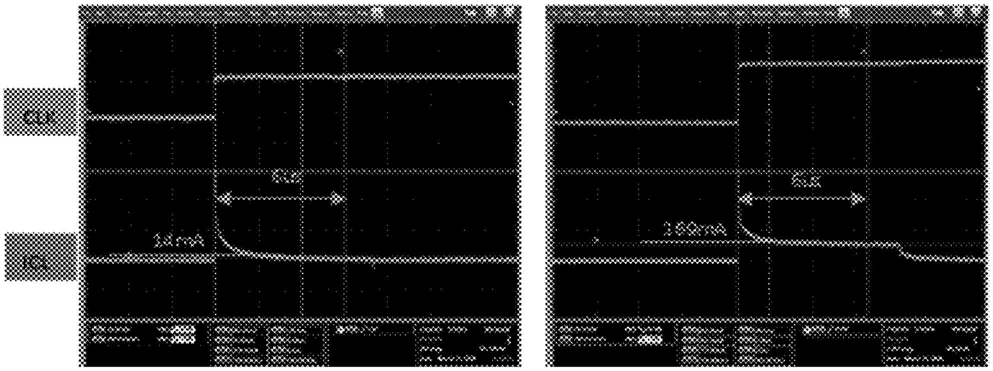
FIG. 2 shows a comparison between a current at a specific location of a clock signal line of a gate driving circuit under a normal operation condition and that under a short-circuit condition.

FIG. 2 shows a comparison between a current at a specific location of a clock signal line of a gate driving circuit under a normal operation condition and that under a short-circuit condition. FIG. 2(*a*) shows the current measured under the normal operation condition. As shown, the measured current is 14 mA. FIG. 2(*b*) shows the current measured under the short-circuit condition. As shown, the measured current is 169 mA. From this, it can be seen that when a short circuit occurs in the clock signal line, the current at the short-circuit location increases significantly, which affects the normal operation of the gate driving circuit.

Figure 3:
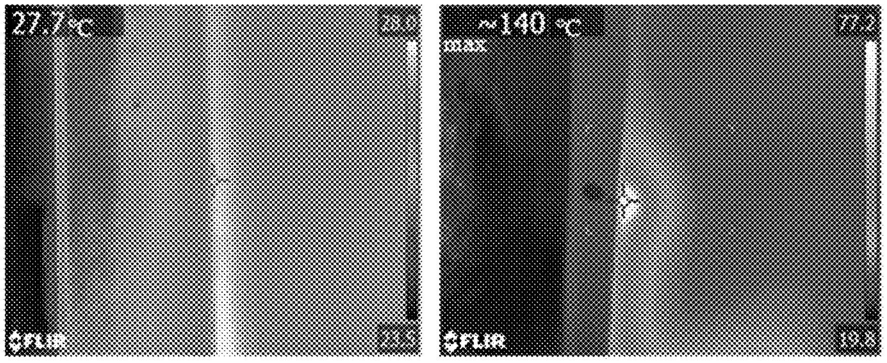
FIG. 3 shows a comparison between a temperature at a specific location of a clock signal line of a gate driving circuit under a normal operation condition and that under a short-circuit condition.

FIG. 3 shows a comparison between a temperature at a specific location of a clock signal line of a gate driving circuit under a normal operation condition and that under a short-circuit condition. FIG. 3(*a*) shows the temperature measured under the normal operation condition. As shown, the measured temperature was 27.7° C. FIG. 3(*b*) shows the temperature measured under the short-circuit condition. As shown, the measured temperature was 140° C. From this, it can be seen that when a short circuit occurs in the clock signal line, the temperature at the short-circuit location increases significantly along with a sharp increase in the current.

As described above, when the short circuit occurs in the signal line, both the current and the temperature at the short-circuit location increase significantly, thereby adversely affecting the operation of the gate driving circuit, and if the operation state of the gate driving circuit is continuously maintained under the short-circuit condition, it may lead to an irreversible damage to the device. In particular, for a gate driving circuit having a GOA configuration, if the short-circuit protection mechanism is lacking, the entire display substrate having the gate driving circuit will be scrapped.

The present disclosure provides a protection circuit for a display device that can stop providing power to a gate driving circuit when a signal line in the gate driving circuit of the display device is short-circuited, thereby reducing adverse effects caused by the short circuit, and thus effectively protect the display device.

Figure 4:
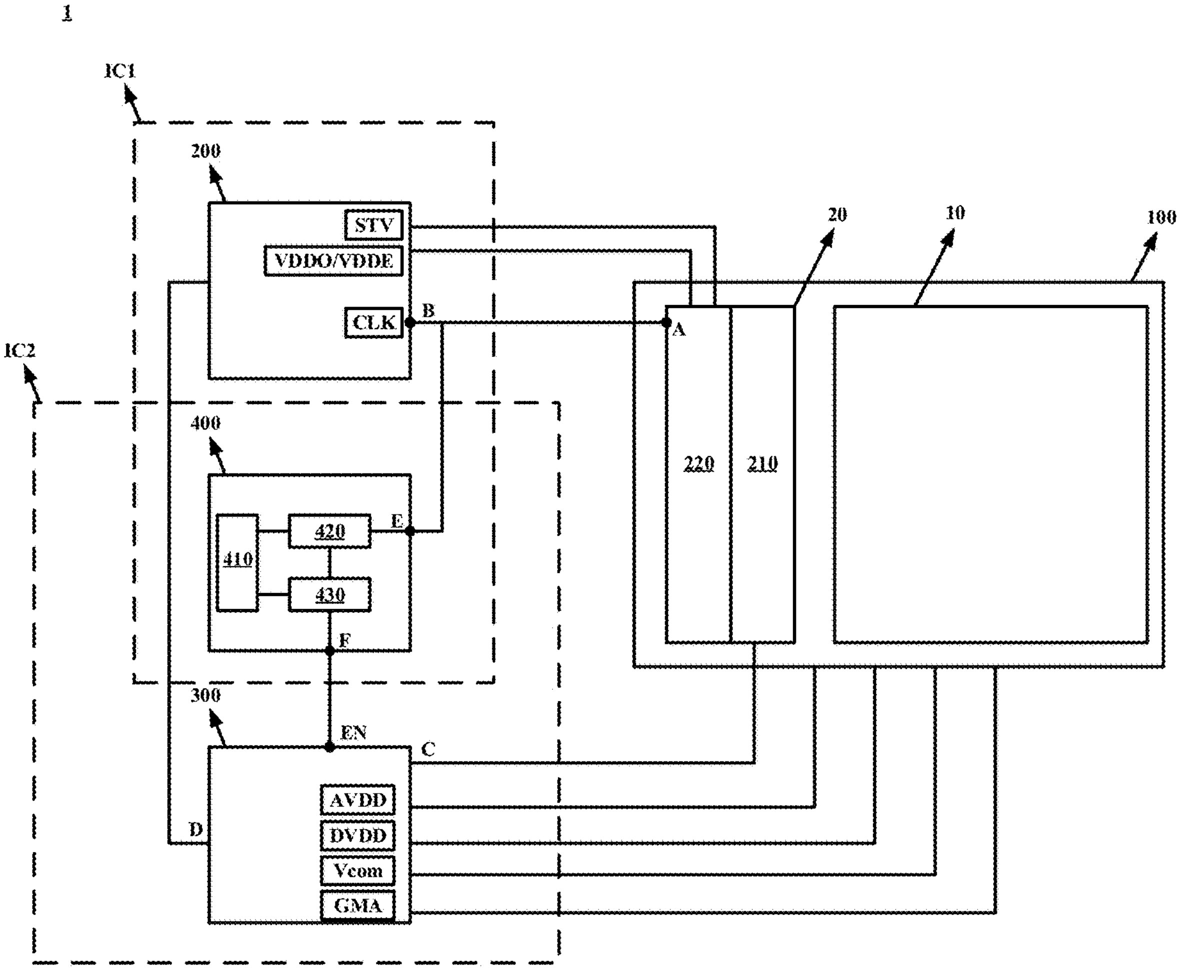
FIG. 4 shows a planar structure of a display device according to an embodiment of the present disclosure.

FIG. 4 shows a planar structure of a display device according to an embodiment of the present disclosure. As shown in FIG. 4, the display device 1 may include a display panel 100, a level shift circuit 200, a power management circuit 300 and a protection circuit 400. The display panel 100 may include a display assembly 10 located in a display region for displaying and a gate driving circuit 20 located in a peripheral region surrounding the display region. The gate driving circuit 20 may include a GOA unit 210 and signal lines 220 coupled to the GOA unit 210. The signal lines 220 may be configured to transmit signals for the GOA unit 210. As an example, the signal lines 220 may include clock signal lines configured to transmit clock signals to the GOA unit 210. It should be noted that, an exemplary embodiment of the gate driving circuit 20 will be described later with reference to FIG. 9.

In an exemplary embodiment of the present disclosure, the level shift circuit 200 may be configured to provide an input signal to a signal input terminal A of the gate driving circuit 20. As an example, the signal input terminal A of the gate driving circuit 20 may include a clock signal input terminal for receiving the clock signals from the level shift circuit 200. For example, the level shift circuit 200 may be configured to provide a clock signal CLK to the signal input terminal A of the gate driving circuit 20 through a signal output terminal B. In addition, the level shift circuit 200 may further be configured to provide a frame start signal STV and a noise reduction signal pair VDDO/VDDE for the GOA unit 210 to corresponding signal input terminals of the gate driving circuit 20 through other signal output terminals.

In an exemplary embodiment of the present disclosure, the power management circuit 300 may be configured to provide power PS1 to the gate driving circuit 20. In addition, the power management circuit 300 may further be configured to provide power PS2 to the level shift circuit 200. For example, the power management circuit 300 may provide the power PS1, PS2 to the gate driving circuit 20 and the level shift circuit 200 through output terminals C and D, respectively. In addition, the power management circuit 300 may further be configured to provide an analog voltage signal AVDD, a digital voltage signal DVDD, a common electrode voltage signal Vcom, and a grayscale reference signal GMA to the display device 1.

In an exemplary embodiment of the present disclosure, the protection circuit 400 may be configured to provide a power control signal SC to the power management circuit 300 based on a current I at the signal input terminal A of the gate driving circuit 20, so that the power management circuit 300 stops providing the power PS1 to the gate driving circuit 20. Therefore, when a short circuit occurs in the gate driving circuit 20, the protection circuit 400 can trigger circuit protection in time, so as to protect the gate driving circuit 20 and avoid a damage to the device.

In an exemplary embodiment of the present disclosure, the protection circuit 400 may include a control circuit 410, a current detection circuit 420, a comparison circuit 430, a current detection terminal E, and a control signal output terminal F.

In an exemplary embodiment of the present disclosure, the current detection terminal E may be configured to receive the current I at the signal input terminal A of the gate driving circuit 20.

In an exemplary embodiment of the present disclosure, the control signal output terminal F may be configured to provide a power control signal SC to the power management circuit 300.

In an exemplary embodiment of the present disclosure, the control circuit 410 may be coupled to the current detection circuit 420 and the comparison circuit 430, and may be configured to send a first control signal C1 to the current detection circuit 420 to control an operation of the current detection circuit 420 and send a second control signal C2 to the comparison circuit 430 to control an operation of the comparison circuit 430.

In an exemplary embodiment of the present disclosure, the current detection circuit 420 may be coupled to the current detection terminal E and the comparison circuit 430, and may be configured to detect the current I at the signal input terminal A of the gate driving circuit 20 under a control of the control circuit 410 (e.g., under the control of the first control signal C1), and send the detected current I to the comparison circuit 430.

In an exemplary embodiment of the present disclosure, the comparison circuit 430 may be coupled to the control signal output terminal F, and may be configured to compare the current I to a first threshold 10 under a control of the control circuit 530 (e.g., under the control of the second control signal C2) and generate the power control signal SC at the control signal output terminal F based on a comparison result.

In an exemplary embodiment of the present disclosure, the protection circuit 400 may be integrated into a same integrated circuit with the level shift circuit 200 and the power management circuit 300. For example, both of them may be formed in the same integrated circuit (IC). As an example, referring to FIG. 4, the protection circuit 400 and the level shift circuit 200 may be integrated into the same integrated circuit IC1. In this case, as an example, the current detection terminal E in the protection circuit 400 and the signal output terminal B in the level shift circuit 200 may be the same terminal. As another example, the protection circuit 400 and the power management circuit 300 may be integrated into the same integrated circuit IC2.

Further, in an exemplary embodiment of the present disclosure, the level shift circuit 200 may provide clock signals to the gate driving circuit through clock signal lines. Specifically, as described above, referring to FIG. 4, the level shift circuit 200 may be configured to provide the clock signal CLK to the signal input terminal A of the gate driving circuit 20 through the signal output terminal B. This clock signal CLK is transmitted to the GOA unit via the clock signal line of the signal lines 220 in the gate driving circuit 20. Further, as an example, the current detection terminal E of the protection circuit 400 may be coupled to the clock signal line. Specifically, the current detection terminal E of the protection circuit 400 may be coupled to the signal input terminal A of the gate driving circuit 20.

In an exemplary embodiment of the present disclosure, generating the power control signal SC based on the comparison result may include: generating the power control signal SC at the control signal output terminal F when the current I is greater than the first threshold 10.

In an exemplary embodiment of the present disclosure, the control circuit 410 may further be configured to receive and store control parameters.

As an example, the control parameters may include the first threshold 10 and a detection time t0. Specifically, the first threshold 10 may be a current threshold. The detection time t0 may be an time interval between a transition edge of a voltage signal at the signal input terminal A to be detected from the gate driving circuit 20 to a timing when the current I is detected.

Further, the control parameters may further include a second threshold N. Specifically, the second threshold N may be a number of times N of continuous detections of the current I based on the detection time t0, where N is an integer greater than 1, and the current I detected each time is greater than the first threshold 10.

In an exemplary embodiment of the present disclosure, further, generating the power control signal SC based on the comparison result may include: generating the power control signal SC at the control signal output terminal F when a plurality of detections are continuously performed and the number of detections is equal to the second threshold N. By setting the second threshold, the power control signal SC can be effectively prevented from being erroneously generated due to the current fluctuation of the gate driving circuit during the normal operation.

In an exemplary embodiment of the present disclosure, an enable signal terminal EN of the power management circuit 300 receives the power control signal SC, and stops providing the power PS1 to the gate driving circuit 20. Therefore, when the clock signal line of the signal lines 220 in the gate driving circuit 20 is short-circuited, the power PS1 provided to the gate driving circuit 20 is stopped, thereby protecting the gate driving circuit 20 and avoiding a damage to the device.

As an example, the current detection terminal E of the protection circuit 400 may be coupled to only one clock signal line, so that the location where the short circuit occurs can be located. As another example, the current detection terminal E of the protection circuit 400 may be coupled to a plurality of clock signal lines. In this case, those skilled in the art can roughly locate the location where the short circuit occurs based on known conditions such as the clock timing.

Figure 5:
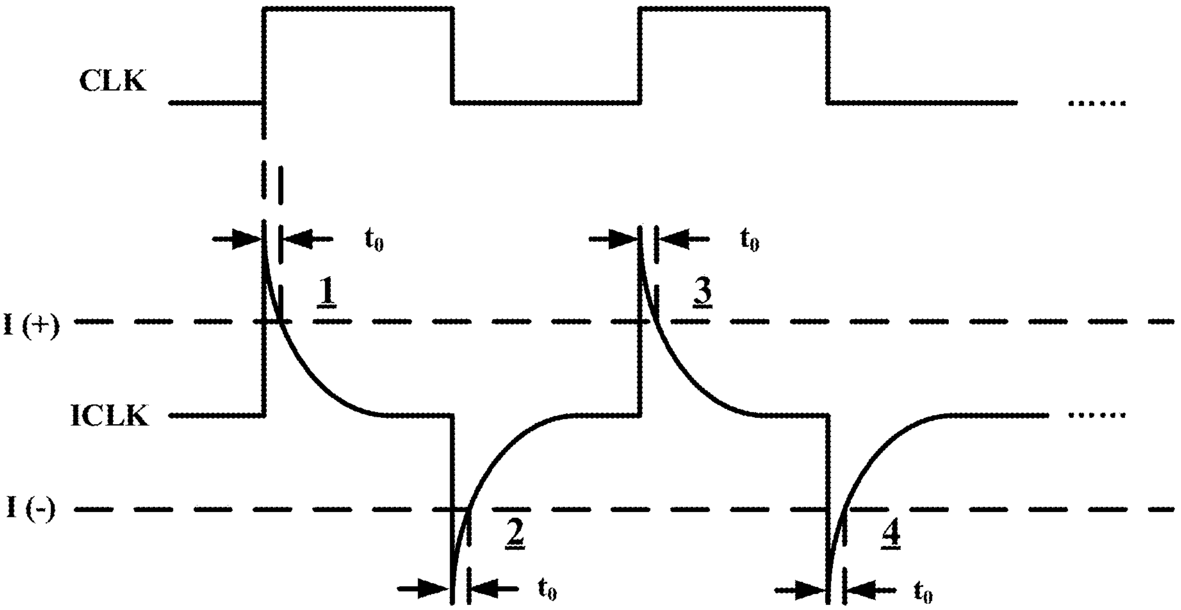
FIG. 5 shows waveforms of a clock signal voltage signal and a clock signal current signal for a gate driving circuit according to an embodiment of the present disclosure.

FIG. 5 shows waveforms of a clock signal voltage signal and a clock signal current signal for a gate driving circuit according to an embodiment of the present disclosure. As shown in FIG. 5, the current I of the current signal ICLK in the clock signal line is detected after t0 elapses from each transition edge of the voltage signal CLK in the clock signal line.

As an example, the detection time t0 may be in a range of 2-16 μs. The first threshold 10 may be in a range of 30-200 mA. The second threshold N may be 4, 8, 16 or 32.

Further, as an example, the detection time t0 may be 6 μs. The first threshold 10 may be 50 mA. The second threshold N may be 8.

Figure 6:
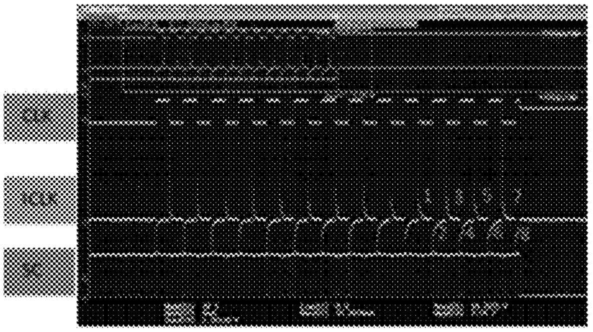
FIG. 6 shows waveforms of a clock signal voltage signal and a clock signal current signal for a gate driving circuit according to an embodiment of the present disclosure.

FIG. 6 shows waveforms of a clock signal voltage signal and a clock signal current signal for agate driving circuit according to an embodiment of the present disclosure. In the case as shown in FIG. 6, the detection time t0 is 6 μs. The first threshold 10 is 50 mA. The second threshold N is 8. Specifically, when the current I of the current signal ICLK in the clock signal line being detected after 6 μs elapses from each transition edge of the voltage signal CLK in the clock signal line is performed continuously for 8 times, and the detected currents I are all greater than 50 mA, the protection circuit 400 generates the power control signal SC at the control signal output terminal F.

As an example, the power control signal SC may include a voltage signal. For example, the voltage signal may be a low voltage signal. For example, the low voltage may be in a range of 0-0.6 V.

Figure 7:
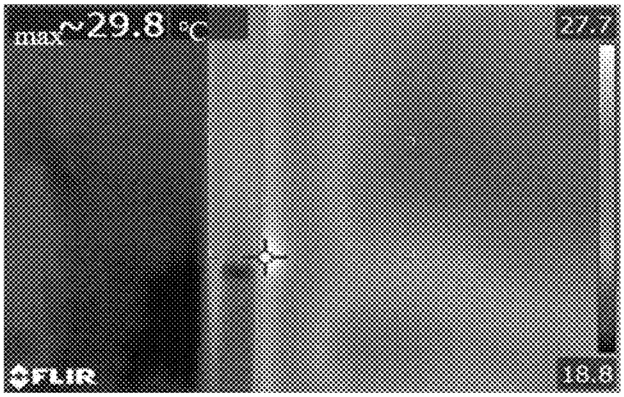
FIG. 7 shows a temperature at a short-circuit location measured after a short-circuit protection mechanism is triggered according to an embodiment of the present disclosure.

FIG. 7 shows a temperature at a short-circuit location measured after a short-circuit protection mechanism is triggered according to an embodiment of the present disclosure. As shown in FIG. 7, after the short-circuit protection mechanism is triggered, that is, in the case where the clock signal line of the signal lines 220 in the gate driving circuit 20 is short-circuited, and when the power management circuit 300 stops providing the power supply PS1 to the gate driving circuit 20 in response to the power control signal SC from the protection circuit 400, the measured temperature at the short-circuit location was 29.8° C. This temperature is close to the room temperature during measurement, which can effectively avoid a damage to the device.

In an exemplary embodiment of the present disclosure, optionally, in the case where the protection circuit 400 and the power management circuit 300 are not integrated into the same integrated circuit, a signal transfer circuit may be disposed between the control signal output terminal F of the protection circuit 400 and the enable signal terminal EN of the power management circuit 300.

Figure 8:
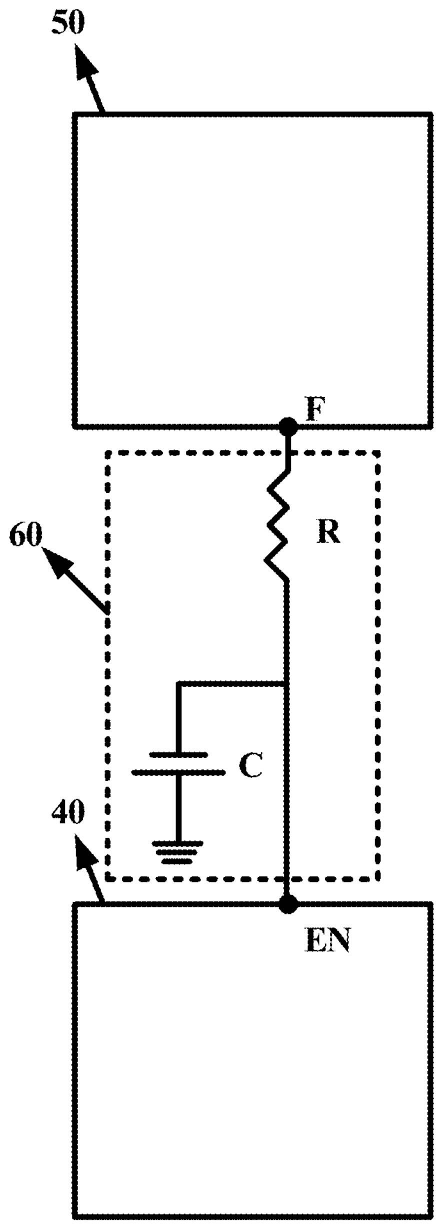
FIG. 8 shows a signal transfer circuit between a protection circuit and a power management circuit according to an embodiment of the present disclosure.

FIG. 8 shows a signal transfer circuit between a protection circuit and a power management circuit according to an embodiment of the present disclosure. As shown in FIG. 8, the signal transfer circuit 60 may be coupled to the protection circuit 400 and the power management circuit 300. Specifically, the signal transfer circuit 60 may be coupled to the control signal output terminal F of the protection circuit 400 and coupled to the enable signal terminal EN of the power management circuit 300.

In an exemplary embodiment of the present disclosure, the signal transfer circuit 60 may be configured to perform noise reduction and filtering on the power control signal SC output from the control signal output terminal F. The signal transfer circuit 60 may include a resistor R and a capacitor C. As an example, the resistor R may be a zero-ohm resistor. It should be noted that, FIG. 8 only shows one capacitor C, which is only a schematic example, and those skilled in the art can set multiple capacitors C according to actual needs and designs. For example, as another example, a plurality of capacitors C may be arranged in parallel to more effectively perform noise reduction and filtering on the signal.

Figure 9:
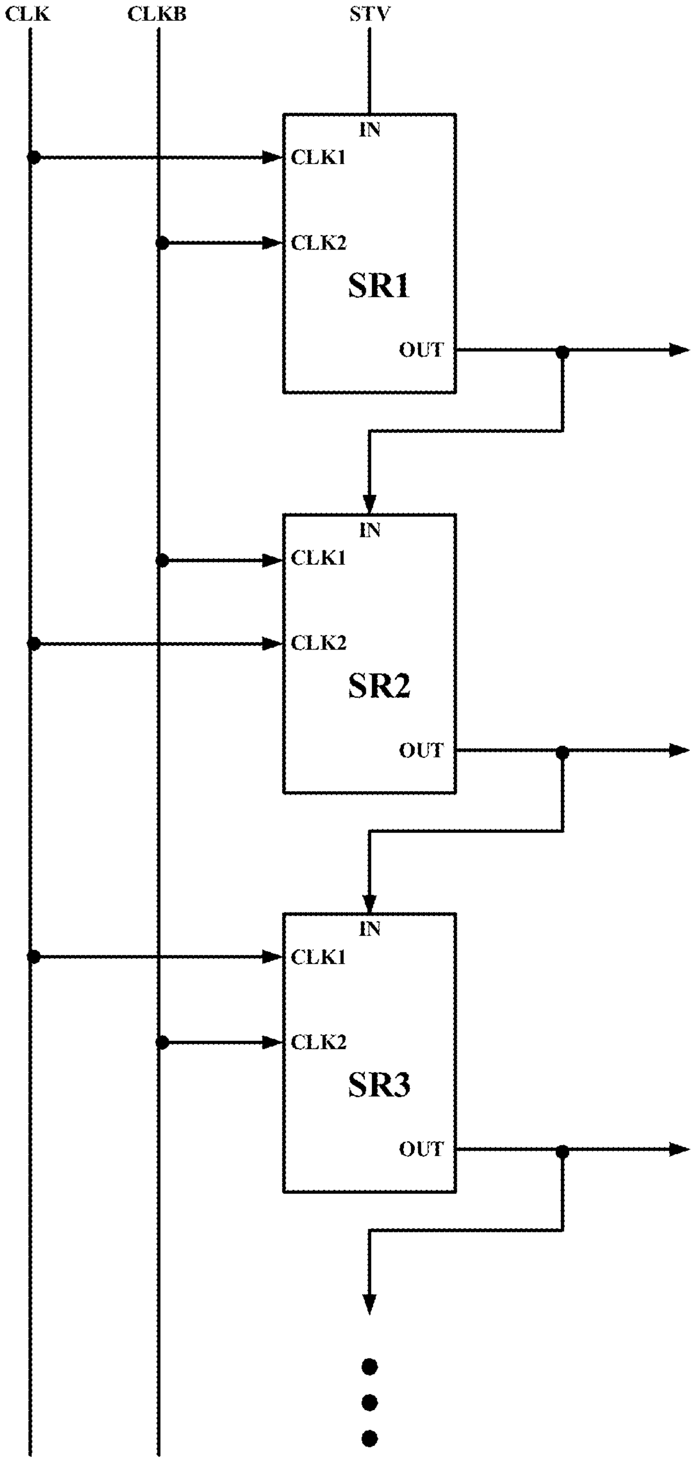
FIG. 9 shows a cascade structure of a gate driving circuit according to an embodiment of the present disclosure.

FIG. 9 shows a cascade structure of a gate driving circuit according to an embodiment of the present disclosure. The GOA unit 210 of the gate driving circuit 20 includes a plurality of cascaded shift register units, e.g., SR1, SR2, SR3. The first stage shift register unit SR1 receives the frame start signal STV as the input signal received by its input signal terminal IN. Except for the first stage shift register unit SR1, each stage shift register unit (e.g., SR2 and SR3) receives the output signals from the output signal terminals OUT of the previous stage shift register unit as the input signal of the current stage shift register unit.

As shown in FIG. 9, a first clock signal terminal CLK1 of each stage shift register unit is connected to one of a first clock signal line CLK and a second clock signal line CLKB, and a second clock signal terminal CLK2 of each stage shift register unit is connected to the other of the first clock signal line CLK and the second clock signal line CLKB.

In an exemplary embodiment of the present disclosure, the first clock signal terminals in adjacent two stage shift register units are connected to different clock signal lines. For example, the first clock signal terminals CLK1 of SR1 and SR2 shown in FIG. 9 are connected to CLK and CLKB, respectively.

Embodiments of the present disclosure further provide a display device including the protection circuit as described above. The display device may further include a display substrate. The display substrate may include a display region for displaying and a peripheral region surrounding the display region. The gate driving circuit is located in the peripheral region.

In an exemplary embodiment of the present disclosure, the display device may further include clock signal lines in the peripheral region. The level shift circuit may provide clock signals to the gate driving circuit through the clock signal lines. The current detection terminal of the protection circuit may be coupled to the clock signal lines.

Embodiments of the present disclosure further provide a method for protecting a display device using the protection circuit as described above. Thus, when a short circuit occurs in the signal line in the gate driving circuit of the display device, the protection mechanism is triggered to stop providing power to the gate driving circuit, thereby protecting the gate driving circuit and avoiding a damage to the device.

Figure 10:
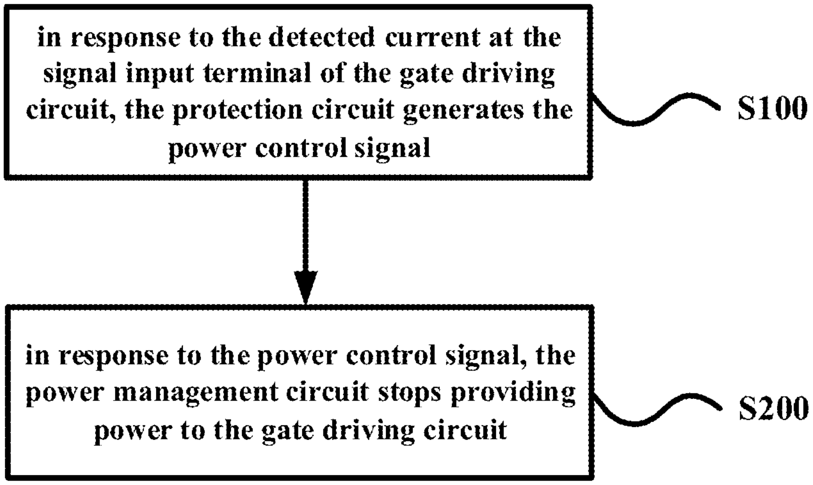
FIG. 10 shows a method for protecting a display device using a protection circuit according to an embodiment of the present disclosure.

FIG. 10 shows a method for protecting a display device using a protection circuit according to an embodiment of the present disclosure. As shown in FIG. 10, the method may include steps S100 and S200. At step S100, in response to the detected current at the signal input terminal of the gate driving circuit, the protection circuit generates the power control signal. At step S200, in response to the power control signal, the power management circuit stops providing power to the gate driving circuit.

The protection method is described in detail below with reference to FIG. 4. It should be understood that, the circuits, signal terminals, etc. in FIG. 4 are similar to the description to FIG. 4 as mentioned above, and the corresponding terms will not be repeated hereinafter.

In an exemplary embodiment of the present disclosure, step S100 may further include: S101, in response to the first control signal C1 from the control circuit 210 in the protection circuit 400, the current detection circuit 420 in the protection circuit 400 receives the current I at the signal input terminal A of the gate driving circuit 20, and send the detected current I to the comparison circuit 430 in the protection circuit 400; S102, in response to the second control signal C2 from the control circuit 210, the comparison circuit 430 receives the current I from the current detection circuit 420, compares the current I to the first threshold 10, and generates the power control signal SC at the control signal output terminal F when the current I is greater than the first threshold value 10, a plurality of detections are continuously performed, and the number of detections is equal to the second threshold N.

Here, the second threshold N may be a number of times N of continuous detections of the current I based on the detection time t0, where N is an integer greater than 1, and the current I detected each time is greater than the first threshold 10. The detection time t0 may be an time interval between a transition edge of a voltage signal at the signal input terminal A to be detected from the gate driving circuit 20 to a timing when the current I is detected.

For other descriptions about the protection circuit, reference may be made to the detailed descriptions about FIGS. 2-9, which will not be repeated here.

The foregoing description of the embodiment has been provided for purpose of illustration and description. It is not intended to be exhaustive or to limit the application. Even if not specifically shown or described, individual elements or features of a particular embodiment are generally not limited to that particular embodiment, are interchangeable when under a suitable condition, can be used in a selected embodiment and may further be varied in many ways. Such variations are not to be regarded as a departure from the application, and all such modifications are included within the scope of the application.

What is claimed is:

1. A protection circuit for a display device, the display device comprising a gate driving circuit, a level shift circuit, and a power management circuit, the level shift circuit being configured to provide an input signal to a signal input terminal of the gate driving circuit, the power management circuit being configured to provide power to the gate driving circuit, wherein the protection circuit is configured to provide a power control signal to the power management circuit based on a current at the signal input terminal of the gate driving circuit, so that the power management circuit stops providing the power to the gate driving circuit;

wherein the protection circuit comprises a control circuit, a current detection circuit, a comparison circuit, a current detection terminal and a control signal output terminal, the current detection terminal is configured to receive the current at the signal input terminal of the gate driving circuit, the control signal output terminal is configured to provide the power control signal to the power management circuit, the control circuit is coupled to the current detection circuit and the comparison circuit, and configured to send a first control signal to the current detection circuit to control an operation of the current detection circuit and send a second control signal to the comparison circuit to control an operation of the comparison circuit, the current detection circuit is coupled to the current detection terminal and the comparison circuit, and configured to detect the current at the signal input terminal of the gate driving circuit under a control of the control circuit, and send the detected current to the comparison circuit, and the comparison circuit is coupled to the control signal output terminal, and configured to compare the current to a first threshold under a control of the control circuit, and to generate the power control signal at the control signal output terminal based on a comparison result;

wherein generating the power control signal based on the comparison result comprises: generating the power control signal at the control signal output terminal when the current is greater than the first threshold;

wherein the control circuit is further configured to receive and store control parameters; and wherein the control parameters comprise the first threshold and a detection time, and wherein the detection time is a time interval between a transition edge of a voltage signal at the signal input terminal to be detected from the gate driving circuit and a timing when the current is detected.

2. The protection circuit according to claim 1, wherein the control parameters further comprise a second threshold, wherein the second threshold is a number of times N of continuous detections of the current based on the detection time, where N is an integer greater than 1, and the current detected each time is greater than the first threshold.

3. The protection circuit according to claim 2, wherein generating the power control signal based on the comparison result comprises: generating the power control signal at the control signal output terminal when a plurality of detections are continuously performed and the number of detections is equal to the second threshold.

4. The protection circuit according to claim 3, wherein the signal input terminal of the gate driving circuit comprises a clock signal input terminal for receiving clock signals from the level shift circuit.

5. The protection circuit according to claim 4, wherein the detection time is in a range of 2-16 μs, the first threshold is in a range of 30-200 mA, and the second threshold is 4, 8, 16 or 32.

6. The protection circuit according to claim 5, wherein the detection time is 6 μs, the first threshold is 50 mA, and the second threshold is 8.

7. The protection circuit according to claim 1, wherein the protection circuit and the level shift circuit or the power management circuit are integrated into a same integrated circuit.

8. The protection circuit according to claim 1, wherein the power management circuit is further configured to provide power to the level shift circuit.

9. A display device comprising the protection circuit according to claim 1, further comprising a display substrate, the display substrate comprising a display region for displaying and a peripheral region surrounding the display region, wherein the gate driving circuit is located in the peripheral region.

10. The display device according to claim 9, wherein the gate driving circuit comprises clock signal lines in the peripheral region, wherein the level shift circuit provides clock signals to the gate driving circuit through the clock signal lines, the current detection terminal of the protection circuit is coupled to the clock signal lines.

11. A method for protecting a display device using the protection circuit according to claim 1, comprising: in response to the detected current at the signal input terminal of the gate driving circuit, the protection circuit generates the power control signal; and in response to the power control signal, the power management circuit stops providing power to the gate driving circuit.

* * * * *